(12) United States Patent
Salah et al.

(10) Patent No.: US 11,109,945 B2
(45) Date of Patent: Sep. 7, 2021

(54) METHOD OF EVALUATING AN ORTHODONTIC ALIGNER

(71) Applicant: DENTAL MONITORING, Paris (FR)

(72) Inventors: Philippe Salah, Bagnolet (FR); Thomas Pellissard, Clichy (FR); Guillaume Ghyselinck, Cantin (FR); Laurent Debraux, Paris (FR)

(73) Assignee: DENTAL MONITORING, Paris (FR)

( * ) Notice: Subject to any disclaimer, the term of this patent is extended or adjusted under 35 U.S.C. 154(b) by 605 days.

(21) Appl. No.: 16/001,049

(22) Filed: Jun. 6, 2018

(65) Prior Publication Data
US 2018/0353263 A1  Dec. 13, 2018

(30) Foreign Application Priority Data

Jun. 9, 2017 (FR) ...................................... 1755187

(51) Int. Cl.
*G06K 9/00* (2006.01)
*A61C 7/00* (2006.01)
*A61C 7/08* (2006.01)
(Continued)

(52) U.S. Cl.
CPC ................ *A61C 7/002* (2013.01); *A61C 7/08* (2013.01); *A61C 9/0053* (2013.01);
(Continued)

(58) Field of Classification Search
CPC ......... A61C 7/002; A61C 7/08; A61C 9/0053; A61C 7/14; A61C 7/00; A61C 7/02;
(Continued)

(56) References Cited

U.S. PATENT DOCUMENTS 8,562,338 B2 * 10/2013 Kitching .................. A61C 7/00
  433/24
9,642,678 B2 * 5/2017 Kuo ........................ G06F 30/20
  (Continued)

FOREIGN PATENT DOCUMENTS

CN  104970891 A * 10/2015
KR  20180017454 A * 2/2018
  (Continued)

OTHER PUBLICATIONS

Corresponding French Application, French Search Report, Application No. 1755187, dated Jan. 22, 2018, 2 pages.

*Primary Examiner* — Mahendra R Patel
(74) *Attorney, Agent, or Firm* — Cooper Legal Group, LLC; Ronald M. Kachmarik

(57) ABSTRACT

A method for evaluating the shape of an orthodontic aligner worn by a patient. Acquisition of at least one two-dimensional image of teeth of the patient as "updated image." At least one updated image as "aligner image," at least partially representing the aligner in a service position. At least one updated image as "dentition image," representing the teeth. If the dentition image is different from the aligner image, conversion of the dentition image so that it represents the teeth as seen under the acquisition conditions used during the acquisition of the aligner image. Determination, for each of a plurality of teeth represented on the dentition and aligner images, of interior and exterior tooth outlines representing the outline of the free end of the tooth on the dentition and aligner images. Comparison of the interior and exterior tooth outlines, followed by determination of at least one score according to the comparison.

10 Claims, 4 Drawing Sheets

(51) Int. Cl.
*A61C 9/00* (2006.01)
*G06T 7/00* (2017.01)
*G06T 7/174* (2017.01)
*G06T 7/136* (2017.01)

(52) U.S. Cl.
CPC ............ *G06T 7/0012* (2013.01); *G06T 7/174* (2017.01); *G06T 7/136* (2017.01); *G06T 2207/30036* (2013.01)

(58) Field of Classification Search
CPC ....... G06T 7/174; G06T 7/0012; G06T 7/136; G06T 2207/30036; G16H 50/50; G16H 50/20
USPC .......................................... 382/128
See application file for complete search history.

(56) References Cited

U.S. PATENT DOCUMENTS

| | | | | |
|---|---|---|---|---|
| 2003/0124480 A1* | 7/2003 | Peacock, III | ............ | A61C 7/18 433/23 |
| 2008/0050692 A1* | 2/2008 | Hilliard | ................ | A61C 7/002 433/24 |
| 2009/0113714 A1* | 5/2009 | Greenberg | ............... | A61C 7/08 29/896.11 |
| 2009/0191503 A1* | 7/2009 | Matov | ................... | A61B 6/032 433/24 |
| 2009/0291417 A1* | 11/2009 | Rubbert | ................ | G06Q 10/06 433/215 |
| 2010/0068672 A1* | 3/2010 | Arjomand | ............... | A61C 9/00 433/24 |
| 2013/0323665 A1* | 12/2013 | Dinh | ........................ | A61C 7/08 433/6 |
| 2014/0120488 A1* | 5/2014 | Greenberg | ............... | A61C 7/08 433/6 |
| 2015/0132707 A1* | 5/2015 | Huang | ..................... | A61C 7/08 433/6 |
| 2015/0132708 A1* | 5/2015 | Kuo | ........................ | G06F 19/00 433/24 |
| 2015/0140502 A1* | 5/2015 | Brawn | .................. | A61C 19/06 433/24 |
| 2015/0257856 A1* | 9/2015 | Martz | ..................... | A61C 7/08 433/6 |
| 2016/0128803 A1* | 5/2016 | Webber | ..................... | A61C 7/36 433/6 |
| 2017/0086943 A1* | 3/2017 | Mah | ........................ | A61C 7/08 |
| 2017/0100214 A1* | 4/2017 | Wen | ....................... | G16H 30/20 |
| 2017/0337682 A1* | 11/2017 | Liao | ........................ | G06T 7/30 |
| 2017/0340414 A1* | 11/2017 | Janzadeh | ................ | A61C 7/08 |

FOREIGN PATENT DOCUMENTS

| | | | | |
|---|---|---|---|---|
| WO | | 2016066637 A1 | 5/2016 | |
| WO | WO-2016066637 A1 | * | 5/2016 | ............. G06T 17/00 |

* cited by examiner

METHOD OF EVALUATING AN ORTHODONTIC ALIGNER

TECHNICAL FIELD

The present invention relates to a method of evaluating the shape of a tray-like orthodontic appliance known as an "aligner", worn by a patient, particularly so as to evaluate how well the shape of the orthodontic aligner conforms to the positioning of the teeth of said patient. The invention also relates to a method for adapting a treatment using orthodontic aligners. The invention finally relates to a computer program for implementing these methods.

PRIOR ART

Conventionally, at the start of orthodontic treatment, the orthodontist determines the positioning of the teeth, referred to as the "set-up", that he wishes to obtain at the end of the treatment. The set-up may be defined by means of an impression or from a three-dimensional scan of the teeth of the patient. The orthodontist then accordingly manufactures an orthodontic appliance suited to this treatment.

The orthodontic appliance may be a tray-like device known as an aligner. An aligner conventionally comes in the form of a removable monobloc appliance, conventionally made of a transparent polymer, which comprises a tray shaped in such a way that several teeth of a dental arch, generally all the teeth of an arch, can be housed therein.

The shape of the aligner is tailored to hold the aligner in position on the teeth while at the same time applying an action towards correcting the positioning of certain teeth.

The shapes that the various aligners at various stages in the treatment need to adopt are conventionally determined at the start of the treatment, then all of the corresponding aligners are manufactured. At predetermined moments, the patient changes aligner.

Treatment using aligners is advantageously less of a burden on the patient. In particular, the number of orthodontist appointments is limited. Furthermore, the pain is less than with a metal orthodontic arch wire attached to the teeth.

The market for orthodontic aligners is therefore growing.

At regular intervals, the patient visits the orthodontist for a visual inspection, notably to check whether the movement of the teeth meets expectations and whether the aligner being worn by the patient is still suitable for the treatment.

If the orthodontist diagnoses that the treatment is inappropriate, he takes a new impression of the teeth, or as is equivalent, a new three-dimensional scan of the teeth, then orders a new series of aligners configured accordingly. It is reckoned that, on average, the number of aligners ultimately manufactured is around 45, rather than the 20 aligners conventionally intended at the start of the treatment.

The need to travel to the orthodontist's is a burden on the patient. The patient's confidence in his orthodontist may also be undermined. The unsuitability may be inesthetic. Finally, this results in additional expense.

The number of orthodontist check-ups needs therefore to be limited.

There is a need for solutions that remedy these problems.

One object of the invention is to provide an at least partial response to this need.

SUMMARY OF THE INVENTION

The invention provides a method for evaluating the shape of an orthodontic aligner worn by a patient, said method comprising the following steps:

1) acquisition of at least one two-dimensional image of the teeth of said patient, referred to as "updated image", under actual acquisition conditions;
   at least one updated image referred to as "aligner image", at least partially representing the aligner in a service position in which it is worn by said teeth; and at least one updated image referred to as "dentition image", identical to or different from the aligner image, representing said teeth,
2) if the dentition image is different from the aligner image, conversion of the dentition image so that it represents said teeth (represented on the dentition image) as seen under the acquisition conditions used during the acquisition of the aligner image in step 1);
3) determination, for each of a plurality of teeth represented on the dentition and aligner images, of interior and exterior tooth outlines representing the outline of the free end of said tooth on the dentition and aligner images, respectively;
4) comparison of the interior and exterior tooth outlines, followed by determination of at least one score according to said comparison.

As will be seen in greater detail in what follows of the description, a method according to the invention makes it considerably easier to evaluate the suitability of the aligner for the treatment, while at the same time making this evaluation particularly reliable. In particular, the method can be implemented using simple photographs or films, taken without special precaution, for example by the patient. The number of orthodontist appointments can therefore be limited.

For preference, an evaluation method according to the invention also has one or more of the following optional features:

the method comprises, after step 4), the following step:
5) comparison of the score against an acceptability threshold and the emission of information according to the result of the comparison;

the dentition and aligner images are different and the method comprises the following steps:
   (a) prior to step 1) for preference at the start of the treatment or before the start of the treatment, the creation of a digital three-dimensional model of at least part of a dental arch bearing said teeth, or "initial reference model" and, for each tooth of the initial reference model, definition of a digital three-dimensional reference model of said tooth, or "tooth model";
   (b) modification of the initial reference model by moving the tooth models until a final reference model compatible with the dentition image is obtained;
   (c) search for a two-dimensional view of the final reference model that is compatible with the aligner image;
   (d) conversion of the dentition image into said view;
alternatively, said dentition and aligner images are one and the same image;

step 4) comprises the following steps:
for each of a plurality of teeth for which the interior and exterior tooth outlines have been determined;
   i) determination of a distance between the interior and exterior tooth outlines;
   ii) determination of a distance threshold, preferably using the distances determined in step i);
   iii) for each of said teeth, determination of a distance score dependent on the distance between the interior and exterior tooth outlines, and
the distance threshold;
said distances are measured in pixels;
in step ii), the distance threshold is dependent on the smallest of the distances determined in step i);
alternatively, step 4) comprises the following steps:
i') for each pair of an adjacent left-hand tooth and of an adjacent right-hand tooth in at least one triplet of adjacent first, second and third teeth, for each of which interior and exterior tooth outlines have been determined, the first and third teeth being adjacent to the second tooth,
determination of an offset between the interior teeth outline of said left-hand tooth and the interior teeth outline of said right-hand tooth, referred to as "interior offset", and determination of an offset between the exterior teeth outline of said left-hand tooth and the exterior teeth outline of said right-hand tooth, referred to as "exterior offset",
then
determination of the difference between the interior offset and the exterior offset, known as the "offset difference";
ii') determination of an offset-difference threshold, preferably using the offset differences determined in step i');
iii') determination, for at least one, preferably for each, tooth of said triplet, of at least one offset score, dependent on the offset difference with an adjacent tooth, and on the offset-difference threshold;
the interior and exterior offsets are measured in pixels;
in step iii'), the offset-difference threshold is dependent on the smallest of the offset differences determined in step i').

The invention also relates to a method of adapting an orthodontic treatment, in which method an evaluation method according to the invention is implemented and then, according to the result of said evaluation, a new aligner is manufactured.

The invention also relates to:
a computer program and, in particular, a specialist application for a mobile telephone, comprising program code instructions for executing one or more, preferably all, of steps 1) to 4), preferably 1) to 5), when said program is run by a computer,
a computer medium on which such a program is recorded, for example a memory or a CD-ROM; and
a personal device, in particular a mobile phone or a tablet, on which such a program is loaded.

The invention also relates to a system comprising:
a three-dimensional scanner able to implement step (a) described hereinbelow, and
a personal device, preferably a mobile telephone, loaded with a program according to the invention.

Definitions

A "dentition" is understood to mean a set of teeth.
A "patient" is understood to mean any person for whom a method according to the invention is implemented, whether this person is sick or not.
The "acquisition conditions" specify the position and orientation in space of an image acquisition apparatus relative to the patient's teeth (actual acquisition conditions) or to a three-dimensional model of the teeth of the patient (virtual acquisition conditions), and preferably the calibration of this image acquisition apparatus, and notably the values of aperture, exposure time, focal length and sensitivity. Acquisition conditions are said to be "virtual", or "theoretical", when they correspond to a simulation in which the acquisition apparatus would be under said acquisition conditions (theoretical positioning and preferably virtual calibration of the acquisition apparatus).

A 3-D scanner is an apparatus that makes it possible to obtain a three-dimensional representation of an object.

What is meant by an "image" is a two-dimensional image such as a photograph. An image is made up of pixels.

A three-dimensional digital model of a set of teeth of a patient is "compatible" with an image when there is a view of this model that corresponds to said image, that is to say such that the elements of said model, for example the outlines of the tooth models, are positioned, relative to one another, like the actual elements that they are modeling, for example the outlines of said teeth, on said image. Thus, a final reference model is compatible with a dentition image if a view of the final reference model allows for the outlines of the tooth models to be viewed in such a way as to make them superposable on the outlines of said teeth on said dentition image.

Said view may be observed by a virtual image acquisition device, under virtual acquisition conditions that may also be qualified as being "compatible" with the image.

When a three-dimensional digital model is compatible with an image, the positioning of the tooth models in this model is also qualified as being "compatible" with the image.

The "service position" is the position in which the aligner is worn by the patient.

The terms "comprise", "include" or "have" should be interpreted broadly and without limitation, unless specified otherwise.

BRIEF DESCRIPTION OF THE FIGURES

Additional features and advantages of the invention will become further apparent upon reading the following detailed description and from studying the attached drawing, in which.

DETAILED DESCRIPTION

Figure 1:
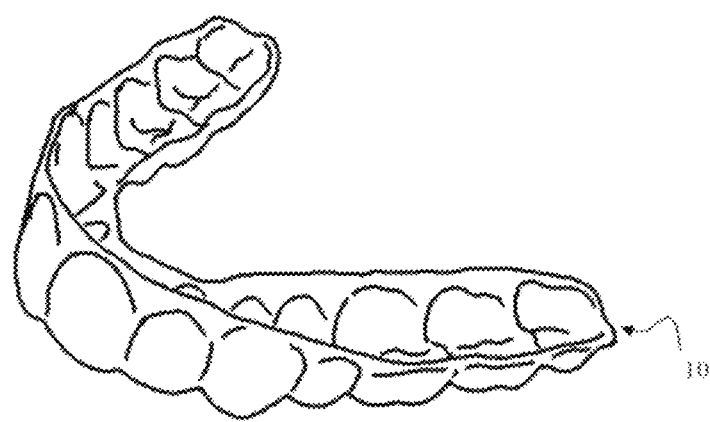
FIGS. 1 and 2 depict an orthodontic aligner.
Figure 2:
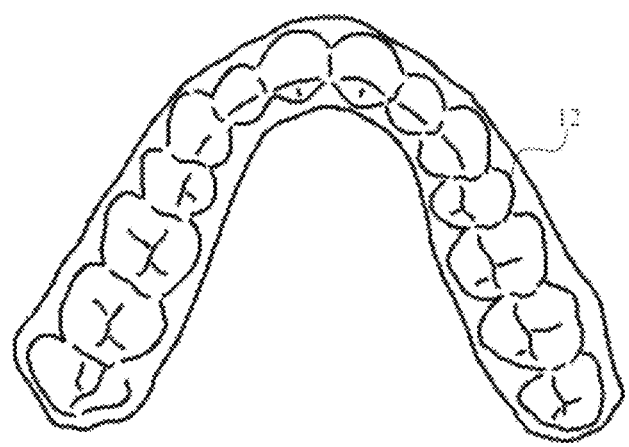

As depicted in FIG. 1, an aligner 10 extends in such a way as to follow the successive teeth D of the dental arch to which it is fitted. It defines a tray in the overall shape of a "U".

The interior surface of the aligner is referred to as the "tray" 12. The shape of the tray is determined to fix the aligner on the teeth, but also according to a target positioning desired for the teeth. More specifically, the shape is determined in such a way that, when the aligner is in its service position, it applies forces that tend to move the treated teeth toward their target positioning.

A "tooth outline" is understood to mean a line displaying the shape of a free end 22 of a tooth on an image.

Figure 4:
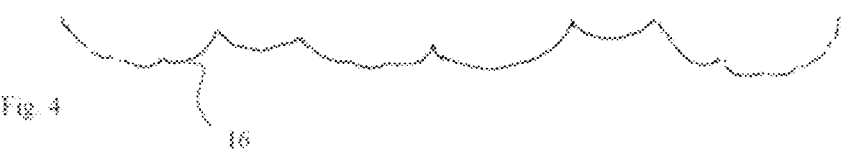
FIG. 4 depicts the dentition outline defined from the image of FIG. 3.

Of course, such a line may delimit the free end of this tooth. The tooth outline is then qualified as an "interior tooth outline" 14. A "dentition outline" 16 is made up of the set of interior tooth outlines of a set of teeth (FIG. 4).

Such a line may also delimit part of the aligner. The tooth outline is then qualified as an "exterior tooth outline" 18. In particular, the bottom 20 of the tray has a shape that substantially compliments that of the free ends 22 of the teeth. As a result, in an image depicting the bottom of the tray, the tray-bottom outline defines a set of exterior tooth outlines 18.

Figure 5:
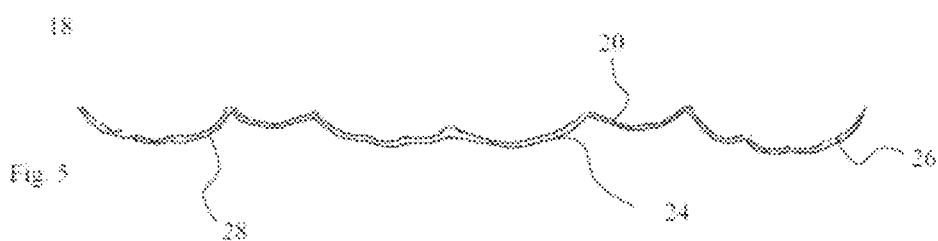
FIG. 5 depicts the aligner outlines defined from the image of FIG. 3 and capable of being used according to the invention.
Figure 6:
FIG. 6 depicts the aligner outline defined from the image of FIG. 3 and used in FIGS. 7 and 8 for comparing against a dentition outline.

The aligner material that separates the exterior surface 24 of the aligner and the tray 12 defines the thickness of the orthodontic aligner. This thickness may be seen in FIG. 5. Conventionally, the aligner has a substantially constant thickness. The exterior surface 24 of the aligner, which extends facing the bottom 20 of the tray, is therefore also substantially the same shape as the bottom of the tray. As a result, in an image, the outline of the exterior surface 24 of the aligner also defines a set of exterior tooth outlines 18.

An "aligner outline" 28 is made up of a set of exterior tooth outlines 18. It may therefore be defined by the bottom 20 of the tray or by the exterior surface 24 of the aligner.

When a tooth is positioned in the tray in such a way that its free end 22 is in contact with the bottom of the tray, its interior tooth outline substantially coincides with the corresponding exterior tooth outline if the exterior tooth outline 18 is defined by the bottom 20 of the tray, or is offset and substantially parallel to the corresponding exterior tooth outline if the exterior tooth outline is defined by the exterior surface 24 of the aligner. For preference, the exterior tooth outlines used to define the aligner outline 28 are defined by the exterior surface 24 of the aligner, which is more visible.

Figure 9:
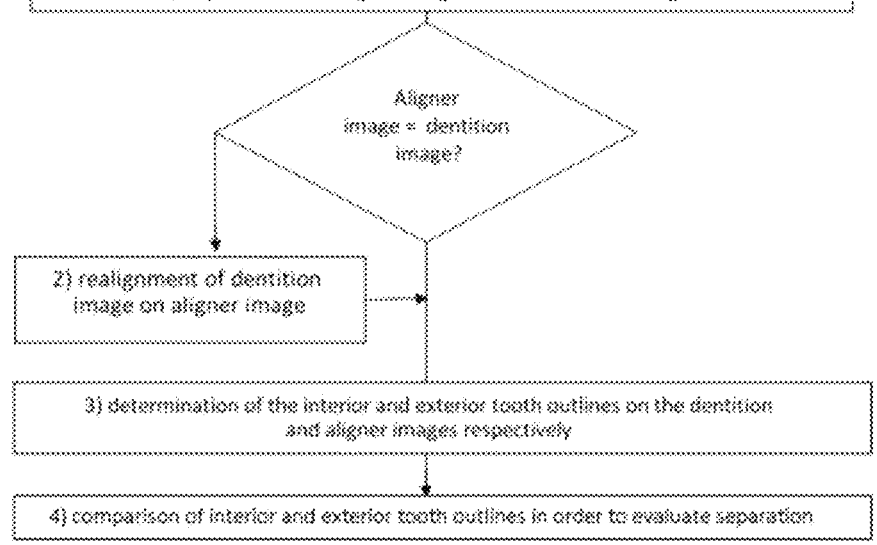
FIG. 9 schematically depicts a method according to the invention.

The method of the invention is aimed at detecting situations in which the free end 22 of a tooth is no longer in contact with the bottom of the tray, and at measuring the amplitude of this separation (FIG. 9).

In step 1), at least one image of the teeth, referred to as "updated image" is taken, using an image acquisition apparatus.

For preference, at least one reminder informing the patient of the need to create an updated image is sent to the patient. This reminder may come on paper, or, for preference, comes in electronic form, for example in the form of an email, of an automatic alert on a specialist mobile application, or of an SMS. Such a reminder may be sent by the patient's orthodontist practice or laboratory or by his dentist or by his specialist mobile application, for example.

Step 1) is performed at the instant that the evaluation of the shape of an aligner is desired, for example over 4 weeks after the start of the treatment using the aligner.

The image acquisition apparatus is preferably a mobile phone, a "connected" camera, a smartwatch, a tablet or a desktop or laptop personal computer, including an image acquisition system, such as a webcam or a camera.

The acquisition is preferably performed by the patient or someone close to the patient, but may be performed by any other individual, notably a dentist or orthodontist, preferably without imposing a requirement for the image acquisition apparatus to be positioned accurately with respect to the teeth.

For preference, the updated image is a photograph or an image extracted from a film. It is preferably in color, preferably true color.

According to the invention, the shape of the aligner is evaluated by comparing an outline of this aligner, in its service position, with an outline of the teeth wearing it.

In step 1), it is therefore necessary to acquire enough updated images to be able to make this comparison, namely at least one image of the aligner in its service position, or "aligner image", and at least one image of teeth bearing this aligner in the service position, or "dentition image".

Figure 3:
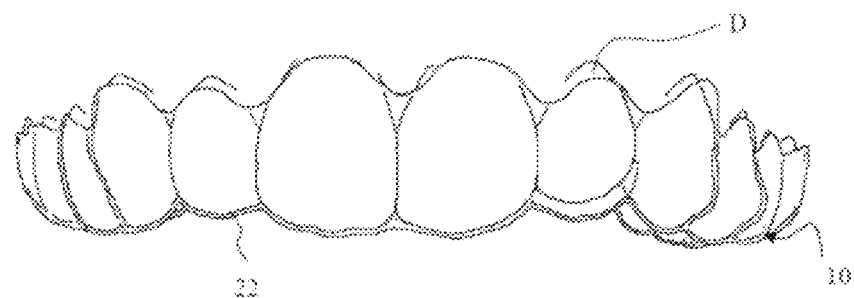
FIG. 3 depicts an updated image of a dental arch bearing an orthodontic aligner like that of FIGS. 1 and 2.

In one embodiment, the dentition image is the aligner image. In other words, the same updated image makes it possible not only to see the aligner outline 28 but also to see the dentition outline 16, through the aligner (FIG. 3). This single image therefore makes it possible to compare aligner and dentition outlines. Advantageously, readjustment step 2), described later, is not needed.

In another embodiment, the dentition image is an image of the teeth in the absence of the orthodontic aligner, referred to as the "bare dentition image". This embodiment is needed if the dentition outline 16 is not clearly visible, through the aligner, on the aligner image.

The operator then takes a first image of the aligner in the service position and, at another moment, having removed the aligner, takes a second image of teeth that wear the part of the aligner depicted in the first image, namely the bare dentition image.

Because the updated images are preferably taken without any special precautions, the bare dentition image is not normally acquired under the same acquisition conditions as the aligner image. In particular, the positions in space of the acquisition apparatus with respect to the teeth and/or the adjustment thereof ("the calibration" of the acquisition apparatus), for example the amount of zoom, may differ when acquiring these two images. The aligner and dentition outlines defined from the bare dentition and aligner images respectively, are therefore not normally immediately comparable. Step 2) is intended to make these outlines comparable by redefining the dentition image.

Figure 10:
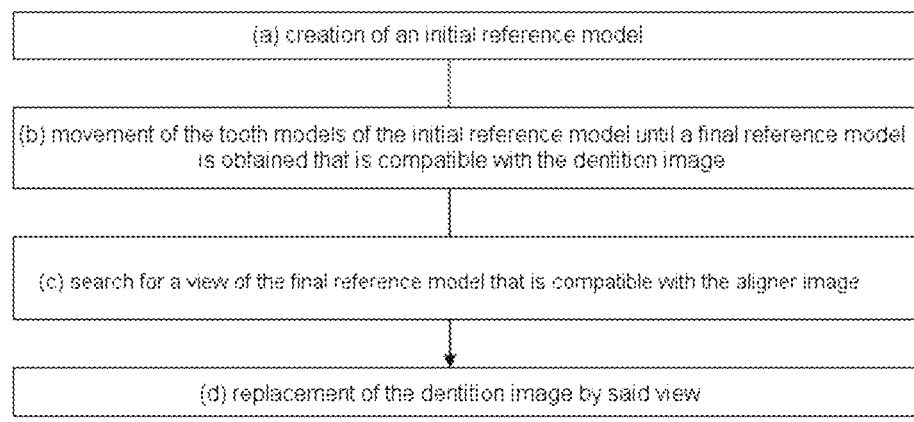
FIG. 10 schematically depicts step 2) of a method according to the invention.

In a particularly preferred embodiment, step 2) (FIG. 10) comprises the steps (a) to (d):

Step (a) is prior to step 1).

It is preferably performed at the start of the orthodontic treatment or before the start of the treatment. It may also be performed at the start of the treatment or before the start of the treatment using the aligner.

Step (a) consists in creating a digital three-dimensional model of a dental arch bearing the teeth treated, or "initial reference model".

The initial reference model is, for example, of the .stl or .Obj, .DXF 3D, IGES, STEP, VDA, or scattergram type. Advantageously, such a model, referred to as a "3-D" model, can be viewed from any angle.

The initial reference model can be prepared from measurements taken from the teeth of the patient or from a physical model of his teeth, for example a plaster cast.

The initial reference model is preferably created by means of a professional device, for example by means of a 3-D scanner, preferably operated by a healthcare professional, for example by an orthodontist, or an orthodontistry laboratory. In an orthodontist practice, the patient or the physical model of his teeth may advantageously be arranged in a precise position and the professional apparatus may be perfected. This results in a highly accurate initial reference model. The initial reference model preferably provides information regarding the positioning of the teeth with an error of less than 5/10 mm, preferably less than 3/10 mm, preferably less than 1/10 mm.

In the initial reference model, a part which corresponds to a tooth is referred to as a "tooth model". The tooth models may be defined as described, for example, in international application PCT/EP2015/074896.

Step (b) comprises modifying the initial reference model, by moving the tooth models, until a positioning of the tooth models that is compatible with the dentition image is obtained.

For preference, step (b) is performed fewer than 4 weeks, fewer than 2 weeks, less than one week, preferably more or less immediately after the acquisition of the dentition image. It preferably consists in an iterative process in which, upon each iteration, one or more tooth models are moved, then optimum conditions for acquiring the initial model thus modified (referred to as the "reference model to be tested") are determined, the optimum conditions being defined as the conditions allowing the reference model to be tested to be observed in such a way that the view of said model is as close as possible to the dentition image.

Steps c) to e) described in PCT/EP2015/074896 are preferably implemented:
- c) analysis of the dentition image (updated image in PCT/EP2015/074896) and creation of an updated map relating to discriminating information;
- d) optionally, determination, for the dentition image, of rough virtual acquisition conditions approximating the actual acquisition conditions of said dentition image;
- e) the search, using the updated map, for a final reference model corresponding to the positioning of the teeth at the time of the acquisition of the dentition image, the search preferably being carried out by means of a metaheuristic, preferably evolutionary method, preferably by simulated annealing.

All the features of steps c) to e) described in PCT/EP2015/074896 are applicable.

According to step c), the dentition image is analyzed so as to create an updated map relating to at least one item of discriminating information.

"Discriminating information" is characteristic information that can be extracted from an image ("image feature"), conventionally through the computer processing of this image.

Discriminating information may exhibit a variable number of values. For example, outline information may be equal to 1 or 0 according to whether or not a pixel belongs to an outline. Brightness information may adopt a great many values. Image processing makes it possible to extract and quantify the discriminating information.

The updated map represents discriminating information in the frame of reference of the dentition image. The discriminating information is preferably chosen from the group consisting of outline information, color information, density information, distance information, brightness information, saturation information, information regarding reflections and combinations of this information.

In optional step d), the actual acquisition conditions for the dentition image acquired in step 1), namely the position and orientation in space of the acquisition apparatus with respect to the teeth and the calibration thereof are evaluated, roughly. Step d) advantageously makes it possible to limit the number of tests on virtual acquisition conditions during step e) and therefore allows step e) to be speeded up considerably.

Use is preferably made of one or more heuristic rules. For example, for preference, conditions that correspond to a position of the image acquisition apparatus behind the teeth or at a distance greater than 1 m away from the teeth, are excluded from the virtual acquisition conditions that can be tested for in step e). In a preferred embodiment, use is made of markers marked on the dentition image in order to determine a substantially conical region of the space that delimits the virtual acquisition conditions that can be tested for in step e), or "test cone".

The objective of step e) is to modify the initial reference model until a final reference model is obtained that corresponds to the dentition image. Ideally, the final reference model is therefore a digital three-dimensional reference model from which the dentition image could have been taken had this model been real.

A succession of reference models "to be tested" is therefore tested, the choice of a reference model to be tested being dependent preferably on the level of correspondence between the previously tested reference models "to be tested" and the dentition image. This choice is preferably made by following a known optimization method, particularly chosen from meta-heuristic optimization methods, preferably evolutionary methods, particularly from simulated annealing methods.

For preference, step e) comprises the following steps:
- e1) definition of a reference model to be tested as being the initial reference model, then
- e2) following the subsequent steps, testing virtual acquisition conditions with the reference model to be tested in order to achieve a fine approximation of said actual acquisition conditions;
  - e21) determining virtual acquisition conditions to be tested;
  - e22) creation of a two-dimensional reference image of the reference model to be tested under said virtual acquisition conditions to be tested;
  - e23) processing of the reference image to create at least a reference map at least partially representing said discriminating information;
  - e24) comparison of the updated and reference maps so as to determine a value for a first evaluation function, said value for the first evaluation function being dependent on the differences between said updated and reference maps and corresponding to a decision as to whether to continue or stop the search for virtual acquisition conditions approximating said actual dentition-image acquisition conditions with greater precision than said virtual acquisition conditions to be tested as determined the last time step e21) was run;
  - e25) if said value for the first evaluation function corresponds to a decision to continue said search, modification of the virtual acquisition conditions to be tested, then resumption from step e22);
- e3) determination of a value for a second evaluation function, said value for the second evaluation function being dependent on the differences between the dentition and reference maps under the virtual acquisition conditions best approximating said actual acquisition conditions and resulting from the last running of step e2), said value for the second evaluation function corresponding to a decision to continue or stop the search for a reference model approximating the positioning of the teeth at the time of the acquisition of the dentition image with greater precision than said reference model to be tested that was used the last time step e2) was run, and if said value for the second evaluation function corresponds to a decision to continue said search, modification of the reference model to be tested by moving one or more tooth models, followed by resumption from step e2).

Steps e1) to e3) are described in detail in PCT/EP2015/074896, or WO2016066651.

The final reference model obtained at the end of step e) is a three-dimensional model resulting from successive modifications to the very precise initial reference model.

Advantageously, it is thus itself very precise, even though it has been obtained from simple photographs taken without any special precautions.

Step (c), is a search for a view of the final reference model that corresponds to the aligner image. Specifically, the aligner image has been acquired under actual acquisition conditions in which the teeth were insufficiently visible. The purpose of step (c) is to determine a view of the final reference model that is compatible with the aligner image, namely a view representing the teeth as they would have been represented on the aligner image had they been sufficiently visible.

In particular, this search leads to a virtual movement of a virtual image acquisition apparatus around the final reference model until a "readjusted" position compatible with the aligner image is found, namely a position in which teeth or parts of teeth can be observed as they would have been represented on the aligner image had the aligner been transparent.

For preference, the search for the view of the final reference model that best corresponds to the aligner image is performed by iteration, preferably by means of a heuristic method, more preferably still by means of one of the methods described hereinafter. These methods advantageously make it possible to guide the virtual movement of the virtual image acquisition apparatus around the final reference model in order to speed up the determination of said readjusted position.

In order to readjust the virtual image acquisition apparatus, it is necessary to identify, in the aligner image, markings of which the position in the final reference model is known. Such markings may generally be identified. Failing that, it is necessary to acquire a new aligner image and to repeat the search for such markings.

The markings preferably belong to teeth that are known to be immobile, for example because they are not being treated (if such teeth are visible on the aligner image) or to parts of the aligner in contact with such teeth, which are therefore likewise immobile. The immobile teeth can be easily identified during step (c), because these are teeth the tooth model of which has not been moved during step (b).

The readjustment entails the use of at least three non-aligned points as markers.

The final reference model is then observed under various virtual acquisition conditions until a view of the final reference model is obtained that is compatible with the aligner image, which means to say in which the markers have identical relative positions. The virtual image acquisition apparatus is then in the readjusted position.

In step (d), the dentition image is replaced with the final view of the reference model observed in the readjusted position, namely under the virtual acquisition conditions determined in step (c).

Indeed the final reference model represents, in three dimensions, the teeth in their positioning at the instant at which the dentition image was acquired, in step 1). Moreover, the virtual acquisition conditions determined in step (c) are substantially identical to the actual acquisition conditions at the instant at which the aligner image was taken in step 1). By observing the final reference model under the virtual acquisition conditions determined in step (c), the teeth are therefore observed at the moment at which the dentition image was taken, under the image acquisition conditions of the aligner image. The view of the final reference model under these virtual acquisition conditions is therefore comparable with the aligner image and therefore replaces the dentition image acquired in step 1). For the sake of clarity, this view is also referred to as "dentition image", which means to say that the view is converted into the dentition image.

The shapes and dimensions of the outlines on the dentition image thus defined are therefore comparable with those of the outlines on the aligner image.

Step 3), determines, for each of a plurality of teeth represented in the dentition and aligner images, the interior and exterior tooth outlines.

A person skilled in the art knows how to process an image in order to isolate an outline. This processing for example involves the well-known application of masks or filters, which come with image processing software. Such processing operations for example make it possible to detect the regions of greatest contrast.

These processing operations notably comprise one or more of the following known and preferred methods, namely:

- by application of a Canny filter, notably to search for outlines using the Canny algorithm;
- by application of a Sobel filter, notably for calculating derivatives by means of the extended Sobel operator,
- by application of a Laplace filter to calculate the Laplacian of an image:
- by detecting blobs on an image ("Blobdetecor"):
- by applying a "Threshold" to apply a fixed threshold to each element of a vector,
- by resizing, using relationships between pixel zones ("Resize(Area)") or bi-cubic interpolations on the pixel environment;
- by image erosion by means of a specific structuring element;
- by image expansion by means of a specific structuring element;
- by image correction, particularly using regions in the vicinity of the restored zone;
- by application of a bilateral filter;
- by application of Gaussian blurring;
- by application of an Otsu filter, to look for the threshold that minimizes variance between classes;
- by application of an A*filter, to search for a path between points;
- by application of an "Adaptive Threshold" for applying an adaptive threshold to a vector,
- by application of a histogram equalization filter to an image in grayscale in particular;
- by "BlurDetection", to calculate the entropy of an image using its laplacian;
- by detecting outlines ("FindContour") of a binary image;
- by filling with color ("FloodFill"), notably to fill a connected element with a determined color.

The following nonlimiting methods, although not preferred, can also be used:

- by application of a "MeanShift" filter so as to find an object on a projection of the image;

by application of a "CLAHE" filter, which stands for "Contrast Limited Adaptive Histogram Equalization";

by application of a "Kmeans" filter, to determine the center of clusters and of groups of samples around clusters;

by application of a DFT filter, so as to perform a direct or inverse Discrete Fourier Transform on a vector, by calculating moments;

by application of a "HuMoments" filter to calculate invariant Hu invariants;

by calculating the integral of an image;

by application of a Scharr filter, making it possible to calculate a derivative of the image by using a Scharr operator;

by searching for the convex envelope of points ("ConvexHull");

by searching for the set of convex points of an outline ("ConvexityDefects");

by shape comparison ("MatchShapes");

by checking whether points form a part of an outline ("PointPolygonTest"); by Harris outline detection ("CornerHarris");

by looking for minimum eigenvalues in matrices of gradients, in order to detect the corners ("CornerMinEigenVal");

by application of a Hough transform in order to find circles in a grayscale image ("HoughCircles");

by "Active contour modeling" (plotting the outline of an object from a potentially "noisy" 2-D image);

by calculating a field of forces, termed GVF ("gradient vector flow"), in part of the image;

by "CascadeClassification".

Tooth outline determination can be optimized by following the teachings of PCT/EP2015/074900.

In step 4) of comparing the outlines, the procedure is preferably in accordance with one of the two particular embodiments hereinbelow, corresponding respectively to FIGS. 7 and 8:

In a first particular embodiment, step 4) comprises steps i) to iii) for each of a plurality of teeth for which interior and exterior tooth outlines have been determined.

Figure 7:
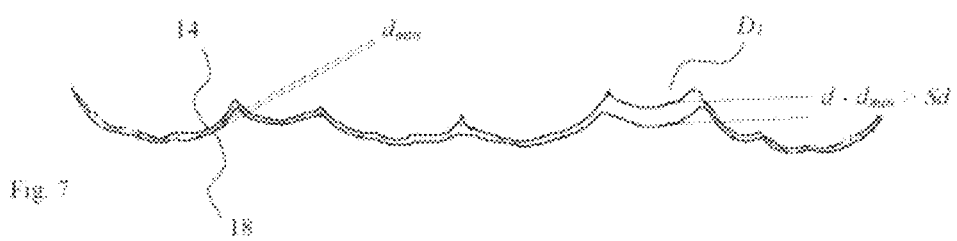
FIGS. 7 and 8 depict the dentition and aligner outlines of FIGS. 4 and 6 as depicted on the updated image of FIG. 3.

In step i), a distance d between the interior and exterior tooth outlines of each of said teeth is determined (FIG. 7).

The distance between the interior 14 and exterior 18 tooth outlines of a tooth may for example be the mean distance or the maximum distance between the pixels of said outlines corresponding to one and the same point on the tooth.

The distance is preferably measured in pixels, which advantageously avoids the need to establish the scale of the dentition and aligner images.

In step ii), a distance threshold Sd is determined, preferably using the distances determined in step i).

For preference, in step ii), the distance threshold Sd is substantially equal to the smallest of the distances determined in step i) ($d_{min}$). Conventionally, in step 1), at least one of the teeth being treated is in contact with the bottom of the tray in which it is inserted. The distance between the interior and exterior tooth outlines of this tooth is then equal to a minimum distance $d_{min}$ corresponding to a normal situation. It can therefore be used as a benchmark in order, in step iii), to evaluate the distances between the interior and exterior teeth outlines of the other teeth.

In step iii), a score known as the "distance score" S(d,Sd), is determined, for each of the teeth, as a function
of the distance d between the interior and exterior tooth outlines and
of the distance threshold Sd.

For preference, the distance score for a tooth is equal to S(d,Sd) namely the difference between the distance between the interior and exterior tooth outlines for this tooth and the distance threshold. The higher the distance score, the greater the separation of the tooth concerned from the tray.

FIG. 7 illustrates one example of implementation of steps i) to iii), in which a tooth D1 has separated from the bottom of the tray and such that $d-d_{min}>Sd$.

In a second particular embodiment, step 4) comprises the steps i') to iii').

Step i') considers at least one triplet made up of first, second and third teeth, D1, D2 and D3 respectively, the first and third teeth being adjacent to the second tooth, which means to say that the first, second and third teeth succeed one another along a dental arch.

The dentition and aligner outlines comprising the respective interior tooth oulines $14_1$, $14_2$ and $14_3$, and respective exterior tooth outlines $18_1$, $18_2$ and $18_3$, of respective teeth D1, D2 and D3, are determined.

An interior or exterior "offset" respectively, represents a distance between the, respectively interior or exterior, tooth outlines of two adjacent teeth.

The following are determined
an offset between the interior tooth outline of said first tooth $14_1$ and the interior tooth outline of said second tooth $14_2$, and referred to as the "first interior offset", $\Delta_{1-2}i$;
an offset between the interior tooth outline of said second tooth $14_2$ and the interior tooth outline of said third tooth $14_3$, and referred to as the "second interior offset", $\Delta_{2-3}i$;
an offset between the exterior tooth outline of said first tooth $18_1$ and the exterior tooth outline of said second tooth $18_2$, and referred to as the "first exterior offset", $\Delta_{1-2}e$;
an offset between the exterior tooth outline of said second tooth $18_2$ and the exterior tooth outline of said third tooth $18_3$, and referred to as the "second exterior offset", $\Delta_{2-3}e$;

The interior offset between the interior tooth outlines of two adjacent teeth is preferably equal to the largest distance between the interior tooth outlines of these two teeth on the dentition outline.

The exterior offset between the exterior tooth outlines of two adjacent teeth is preferably equal to the largest distance between the exterior tooth outlines of these two teeth on the aligner outline.

Figure 8:
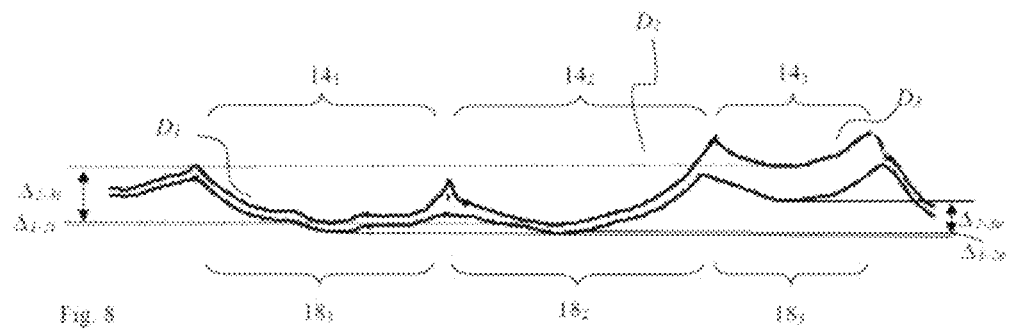

The interior offsets and the exterior offsets are preferably measured in pixels, which advantageously avoids the need to establish the scale of the dentition and aligner images. The following are then determined:
the difference between the first interior offset $\Delta_{1-2}i$ and the first exterior offset $\Delta_{1-2}e$, referred to as "first offset difference" $\Delta_{1-2}$ $(=\Delta_{1-2}i-\Delta_{1-2}e)$;
the difference between the second interior offset $\Delta_{2-3}i$ and the second exterior offset $\Delta_{2-3}e$, referred to as "second offset difference" $\Delta_{2-3}$ $(=\Delta_{2-3}i-\Delta_{2-3}e)$;

In the example of FIG. 8, $\Delta_{1-2}$ is far smaller than $\Delta_{2-3}$.

Step ii'), determines an offset-difference threshold SΔ, preferably from the first and second offset differences $\Delta_{1-2}$ and $\Delta_{2-3}$ determined in step i').

For preference, in step ii'), the offset threshold is substantially equal to the smallest of the offset differences determined in step i').

Conventionally, in step i), at least two adjacent teeth being treated are in contact with the bottom of the tray in which they are inserted. The difference in offset between these two treated teeth is then substantially zero. This zero difference in offset corresponds to a normal situation and can therefore be used as a benchmark for evaluating the differences in offset between adjacent treated teeth.

In FIG. 8, the difference in offset between two teeth $D_1$ and $D_2$ is substantially zero.

In step iii'), at least one score known as the "offset score", is determined, for each pair of teeth of said triplet, as a function of the difference in offset with a tooth adjacent to said tooth and of the offset-difference threshold.

In particular, the difference in offset of the first tooth with the second tooth may be compared against the offset-difference threshold $S\Delta$, for example of zero. The offset-difference threshold may notably be subtracted from the offset difference of the first tooth with respect to the second tooth in order to determine a score for the offset between the first and second teeth.

This offset score indicates, for example if it is positive, that one or each of the first and second teeth is liable to be separated from the bottom of the tray.

In FIG. 8, the difference in offset between the two teeth $D_2$ and $D_3$ is positive, which is an indication that the second or third tooth has separated.

In FIG. 8, since the difference in offset between the two teeth $D_1$ and $D_2$ is substantially zero, the positive difference in offset between the two teeth $D_2$ and $D_3$ therefore indicates that the third tooth has separated.

In general, when a first offset score for first and second teeth indicates the separation of one of these two teeth, a second offset score is determined for the second tooth and a third tooth adjacent to the second tooth. If the second offset score is lower than the first offset score, it is probable that it is the first tooth that has separated from the bottom of the tray. If not, it is probably the second tooth that has separated.

In step 5), information, for example an alert, is sent to an operator to inform him, if appropriate, that the situation is abnormal. The information relating to a tooth is dependent on the score or scores established in step 4). For preference, the information comprises a value making it possible to quantify, for at least one tooth, the level of separation of the aligner over this tooth, this value preferably being established from the score or scores calculated for this tooth in step 4).

In one embodiment, this information is used to establish a diagnosis and/or to modify the treatment, particularly to recommend a change in aligner and/or to determine the characteristics of a future aligner for the patient.

As is now clearly apparent, a method according to the invention makes it possible, from simple photos or a simple film, to determine the regions in which the aligner has come away from the teeth and evaluate the extent of this separation.

Of course, the invention is not restricted to the embodiments described hereinabove and depicted.

Finally, the patient is not limited to a human being. In particular, a method according to the invention can be used on another animal.

The invention claimed is:

1. A method for evaluating the shape of an orthodontic aligner worn by a patient, said method comprising the following steps:
   1) acquisition of at least one two-dimensional image of teeth of said patient, referred to as "updated image", under actual acquisition conditions;
      at least one updated image referred to as "aligner image", at least partially representing the aligner in a service position in which it is worn by said teeth;
      and at least one updated image referred to as "dentition image", identical to or different from the aligner image, representing said teeth,
   2) if the dentition image is different from the aligner image, conversion of the dentition image so that it represents said teeth as seen under the acquisition conditions used during the acquisition of the aligner image in step 1);
   3) determination, by means of image processing software, for each of a plurality of teeth represented on the dentition and aligner images, of interior and exterior tooth outlines representing the outline of the free end of said tooth on the dentition and aligner images, respectively;
   4) comparison of the interior and exterior tooth outlines, so as to determine at least one score according to said comparison.

2. The method as claimed in claim 1, comprising, after step 4), the following step:
   5) comparison of the score against an acceptability threshold and the emission of information according to the result of the comparison.

3. The method as claimed in claim 1, in which the dentition and aligner images are different, the method comprising the following steps:
   (a) prior to step 1), the creation of a digital three-dimensional model of at least part of a dental arch bearing said teeth, or "initial reference model" and, for each tooth of the initial reference model, definition of a digital three-dimensional reference model of said tooth, or "tooth model";
   (b) modification of the initial reference model by moving the tooth models until a final reference model compatible with the dentition image is obtained;
   (c) search for a two-dimensional view of the final reference model that is compatible with the aligner image;
   (d) conversion of the dentition image into said view.

4. The method as claimed in claim 1, in which the dentition and aligner images are the same image.

5. The method as claimed in claim 1, in which step 4) comprises the following steps:
   for each of a plurality of teeth for which the interior and exterior tooth outlines have been determined;
      i) determination of a distance between the interior and exterior tooth outlines;
      ii) determination of a distance threshold, preferably using the distances determined in the immediately preceding step;
      iii) for each of said teeth, determination of a distance score dependent on
         the distance between the interior and exterior teeth outlines, and
         the distance threshold.

6. The method as claimed in claim 5, in which the distances are measured in pixels.

7. The method as claimed in claim 5, in which, in step ii), the distance threshold is dependent on the smallest of the distances determined in step i).

8. The method as claimed in claim 1, in which step 4) comprises the following steps:
   i') for each pair of an adjacent left-hand tooth and of an adjacent right-hand tooth in at least a triplet of adjacent first, second and third teeth, for each of which interior and exterior tooth outlines have been determined, the first and third teeth being adjacent to the second tooth, determination of an offset between the interior teeth outline of said left-hand tooth and the interior teeth outline of said right-hand tooth, referred to as "interior offset", and determination of an offset between the exterior teeth outline of said left-hand tooth and the exterior teeth outline of said right-hand tooth, referred to as the "exterior offset",
then
determination of the difference between the interior offset and the exterior offset, known as the "offset difference";

ii') determination of an offset-difference threshold, preferably using the offset differences determined in step i');

iii') the determination, for each tooth of said triplet, of at least one offset score, dependent on the offset difference with an adjacent tooth, and on the offset-difference threshold.

9. The method as claimed in claim 8, in which the interior and exterior offsets are measured in pixels.

10. The method as claimed in claim 9, in which, in step iii'), the offset-difference threshold is dependent on the smallest of the offset differences determined in step ii').

\* \* \* \* \*